United States Patent
Randleman et al.

(10) Patent No.: US 8,668,255 B1
(45) Date of Patent: Mar. 11, 2014

(54) STAMPED ROOF PANEL FOR A UTILITY VEHICLE CAB

(71) Applicant: Caterpillar Inc., Peoria, IL (US)

(72) Inventors: Sean A. Randleman, Spring Bay, IL (US); Timothy J. Linder, Morton, IL (US); Mark Wayne Hammerton, Peoria, IL (US); Rajesh Mishra, Dunlap, IL (US); Dale B. Higdon, Dunlap, IL (US); Ahti J. Isolehto, Dubuque, IA (US); Thomas A. Jenne, Peoria, IL (US); Daniel K. Allen, Princeville, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/685,964

(22) Filed: Nov. 27, 2012

(51) Int. Cl.
*B62D 25/07* (2006.01)

(52) U.S. Cl.
USPC .......................... 296/213; 296/102; 296/225

(58) Field of Classification Search
USPC .................. 296/102, 210, 213, 225; D12/401
See application file for complete search history.

(56) References Cited

U.S. PATENT DOCUMENTS

| | | | |
|---|---|---|---|
| 4,020,603 A | 5/1977 | Austill | |
| 4,036,522 A | 7/1977 | DeRees et al. | |
| 4,605,259 A | 8/1986 | Hurlburt | |
| 4,837,914 A | 6/1989 | Borum et al. | |
| 5,094,500 A | 3/1992 | Maypole et al. | |
| 6,186,584 B1 | 2/2001 | Samuelson et al. | |
| 6,309,012 B1 | 10/2001 | Fryk et al. | |
| 6,464,291 B2 | 10/2002 | Hynds et al. | |
| 6,470,559 B1 * | 10/2002 | Spaulding et al. | 29/469.5 |
| 7,182,381 B2 | 2/2007 | Ogawa et al. | |
| D554,574 S * | 11/2007 | Hanson et al. | D12/401 |
| 7,290,831 B2 | 11/2007 | Poss et al. | |
| 7,334,834 B2 | 2/2008 | Hill et al. | |
| 2007/0152463 A1 * | 7/2007 | Hardy et al. | 296/37.1 |
| 2012/0061998 A1 | 3/2012 | Carsley | |

* cited by examiner

*Primary Examiner* — Lori Lyjak
(74) *Attorney, Agent, or Firm* — Timothy A. Parker

(57) ABSTRACT

A stamped roof panel for the cab of a utility vehicle includes a base portion having a periphery, a protrusion extending upwardly around the periphery of the base portion, and a plurality of drainage gaps in the protrusion. The protrusion has a generally U-shaped cross-sectional profile with a first leg extending from the base portion, a bight portion, and a second leg extending downwardly from the bight portion. The second leg of the protrusion may extend downwardly beyond the base portion and the top edge of the wall panels of the cab. The roof panel may further include a raised panel spaced upwardly from the base portion.

20 Claims, 6 Drawing Sheets

STAMPED ROOF PANEL FOR A UTILITY VEHICLE CAB

TECHNICAL FIELD

The present disclosure relates generally to a cab for a utility vehicle and, more particularly, to a stamped roof panel for a utility vehicle cab that provides improved water drainage.

BACKGROUND

Off-highway vehicles such as, for example, agricultural and industrial tractors, often operate in less than ideal conditions. Accordingly, these vehicles are typically provided with a cab or enclosure that provides protection to the operator of the vehicle from the undesirable conditions of the worksite. These unfavorable conditions may include extreme heat or cold, precipitation, relatively large quantities of airborne dust or other particulates, and UV rays. In addition to protecting the operator of the vehicle from the elements, the cab may also act as a falling-object protective structure (FOPS) and a roll-over protective structure (ROPS) consistent with safety standards and requirements imposed by various industries and governments.

U.S. Pat. No. 6,464,291—issued to Hynds et al. on Oct. 15, 2002—discloses a canopy top for a utility or recreational vehicle having improved drainage. The canopy has a gutter extending along a portion of its top surface and a drain hole extending through the canopy. The drain hole has a given configuration with a receiving edge extending along the gutter's collection surface. The hole also has an exit edge extending along the bottom surface and the receiving and exit ledges are tapered toward one another and joined by an arcuate transition portion.

The apparatus of the present disclosure alleviates one or more deficiencies of the prior art.

SUMMARY OF THE INVENTION

One aspect of the present disclosure is directed to a stamped metal roof panel adapted for use on a utility vehicle, the stamped roof panel comprising a front edge, a rear edge, and first and second side edges spaced from one another and interconnecting the front and rear edges, the front, rear and side edges forming a periphery of the roof panel. The stamped metal roof panel further includes a base portion and an outwardly projecting protrusion extending from the base portion around substantially all of the periphery of the stamped metal roof panel. A first drainage gap is formed as a first extension of the base portion between adjacent portions of the protrusion proximate an intersection of the rear edge and the first side edge, a second drainage gap is formed as a second extension of the base portion between adjacent portions of the protrusion proximate an intersection of the rear edge and the second side edge and a third drainage gap is formed as a third extension of the base portion in between adjacent portions of the protrusion along the front edge.

Another aspect of the present disclosure is directed to a cab for a utility vehicle including a floor panel and a plurality of wall panels extending upwardly from the floor panel, each wall panel having a top edge. The cab also includes a stamped metal roof panel including a base portion having a periphery and a protrusion extending outwardly around the periphery of the base portion. The protrusion has a first leg extending from the base portion, a bight portion extending from the first leg and a second leg extending from the bight portion opposite the first leg, the second leg of the protrusion extending beyond the base portion and the top edge of the wall panels. A plurality of drainage gaps are provided in the protrusion.

Another aspect of the present disclosure is directed to a stamped metal roof panel adapted for use on a cab of a utility vehicle, the stamped metal roof panel including a base portion having a periphery and a protrusion extending outwardly around the periphery of the base portion. The protrusion has an arcuate sectional profile with a first leg extending from the base portion, a bight portion, and a second leg extending from the bight portion opposite the first leg, the second leg of the protrusion extending beyond the base portion. A plurality of drainage gaps are provided in the protrusion. A raised panel is provided on the stamped roof panel, the raised panel extending outwardly from the base portion and angled relative to the base portion, a plurality of sloped side surfaces extending between the raised panel and the base portion and a stiffening groove. A channel is formed between a lower edge of the sloped side surfaces and the protrusion.

DETAILED DESCRIPTION

Figure 1:
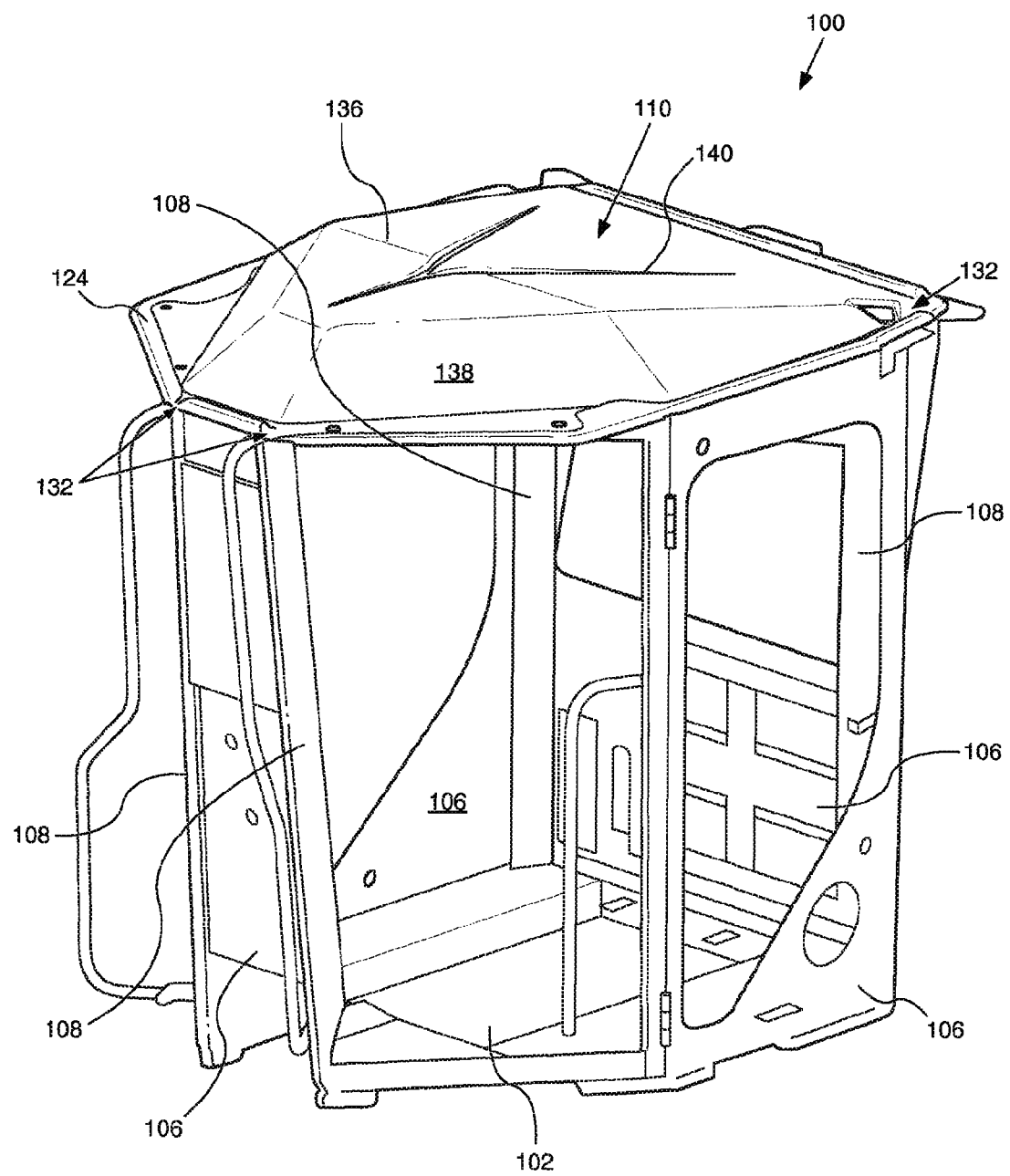
FIG. 1 is a perspective view of a cab including a stamped roof panel according to the concepts of the present disclosure.

Referring now to FIG. 1, a cab 100 for a utility vehicle is shown and is indicated generally by the numeral 100. The cab 100 can enclose and protect the vehicle controls and the operator of the vehicle. As will be understood by those skilled in the art, the cab 100 may be utilized with a variety of agricultural, construction or other off-road vehicles, which are referred to herein collectively as utility vehicles. The cab 100, as shown in FIG. 1 and described herein, may include a floor panel 102 adapted to be secured to the frame of a utility vehicle. The floor panel 102 may include any number of design variations, such as, for example, steps, ramps, pedestals, openings, mounting holes, wiring channels, and the like. A seat may be secured to the floor panel 102 within the cab 100 to provide a place for an operator to sit. In certain embodiments, the floor panel 102 may be a single, integral stamped metal component, and may therefore require zero or minimal welds during fabrication of the cab 100.

The cab 100 may also include one or more wall panels 106 that form a part of the enclosure. The wall panels 106 may include one or more openings or windows to provide an operator a view of the surrounding areas, and one or more doors (not shown) to allow ingress and egress from the cab 100. In the embodiment shown in FIG. 1 front, rear, and opposing side wall panels 106 are included. Like the floor panel 102, the side wall panels 106 may each be a single, integral stamped metal component. Upright support posts 108 may extend upwardly from the floor panel 102. The upright support posts 108 provide strength to the cab 100 and support for overhead components.

A stamped metal roof panel 110 may be supported at the top of the upright support posts 108 to form a top of the cab 100. The stamped metal roof panel 110, by virtue of the manufacturing process used to produce it, is formed from a single integral metal component. Necessary holes, slots, grooves, or other modifications to the stamped metal roof panel 110 may be created through known machining processes preceding, during or following the stamping of the panel. The stamped metal roof panel 110 may have any desired peripheral shape based upon the overall shape of the cab 100 and may include linear or curved peripheral edges.

In the embodiment shown in FIGS. 1-5, the stamped metal roof panel 110 may include a base portion 111 having a plurality of edges. For example, the base portion 111 may be generally planar and may include at least one of a front edge 112, a rear edge 114, a first side edge 116 extending between the front edge 112 and rear edge 114 and a second side edge 118 interconnecting the front edge 112 and rear edge 114. The rear edge 114 and first and second side edges 116 and 118 can be generally linear and the side edges 116 and 118 may be oriented substantially perpendicular to the rear edge 114. The front edge 112 may include angled side portions 120 and 121 and a center portion 122 that is generally parallel to the rear edge 114. The front, rear and side edges 112, 114, 116, and 118 of the base portion 111 together may form an outer peripheral edge of the stamped metal roof panel 110.

A protrusion 124 may be provided around at least a portion of the outer periphery of the stamped metal roof panel 110 and may be formed extending outwardly from the base portion 111. In certain embodiments the protrusion 124 may be arcuate in shape with an inverted U-shaped cross-sectional profile (see FIG. 5). A first leg 126 may extend upwardly from the base portion 111, a bight portion 128 may extend from the opposite end of the first leg 126, and a second leg 130 may extend downwardly from the bight portion 128 opposite the first leg 126. It should be appreciated that the protrusion 124 may also be provided with other cross-sectional profiles, such as, for example, a V-shaped cross-sectional profile, as desired and as may be dictated by other design and/or manufacturing considerations.

Figure 6:
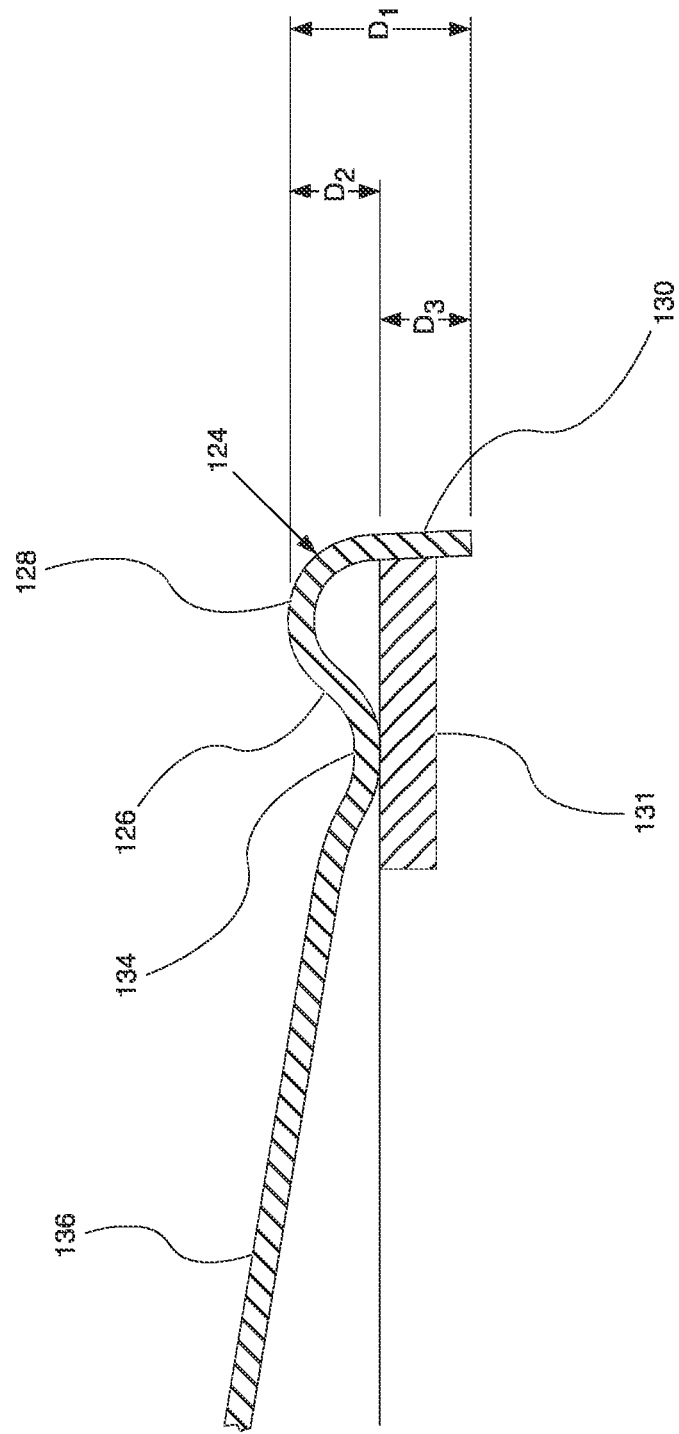
FIG. 6 is an enlarged cross-sectional view of a protrusion according to the present disclosure as indicated in FIG. 5.

In certain embodiments, the second leg 130 of the protrusion 124 may extend downwardly beyond the base portion 111 of the stamped metal roof panel 110 along one or more edges or at one or more locations along the outer peripheral edge. More specifically, as shown in FIG. 6, the distance $D_1$ from the peak of the bight portion 128 to the bottom of the second leg 130 may be greater than the distance $D_2$ from the peak of the bight portion 128 to the bottom of the base portion 111. The difference $D_3$ between $D_1$ and $D_2$ creates an edge wrap that extends beyond the base portion 111 in a direction opposite the protrusion 124.

In particular embodiments, $D_3$ may be at least about 5 mm (0.2 inch), in other embodiments $D_3$ may be at least about 5.5 mm (0.22 inch), and in still other embodiments, $D_3$ may be at least about 6 mm (0.24 inch).

In particular embodiments a horizontal plate 131 may be supported at the top of the upright support posts 108 and the second leg 130 of the stamped metal roof panel 110 may be welded to the horizontal plate 131. However, it is contemplated that the stamped metal roof panel 110 may be secured to the wall panels 106, upright support posts 108, the horizontal plate 131 and/or another mounting surface using the second leg 130, all of which may be referred to as a mounting portion. In a particular embodiment, the stamped metal roof panel 110 may be secured by a weld positioned between the second leg 130 and the mounting portion. In certain embodiments, $D_3$ is large enough to create a weld shelf for receipt of a weld joint between the stamped metal roof panel 110 and the mounting portion.

Figure 2:
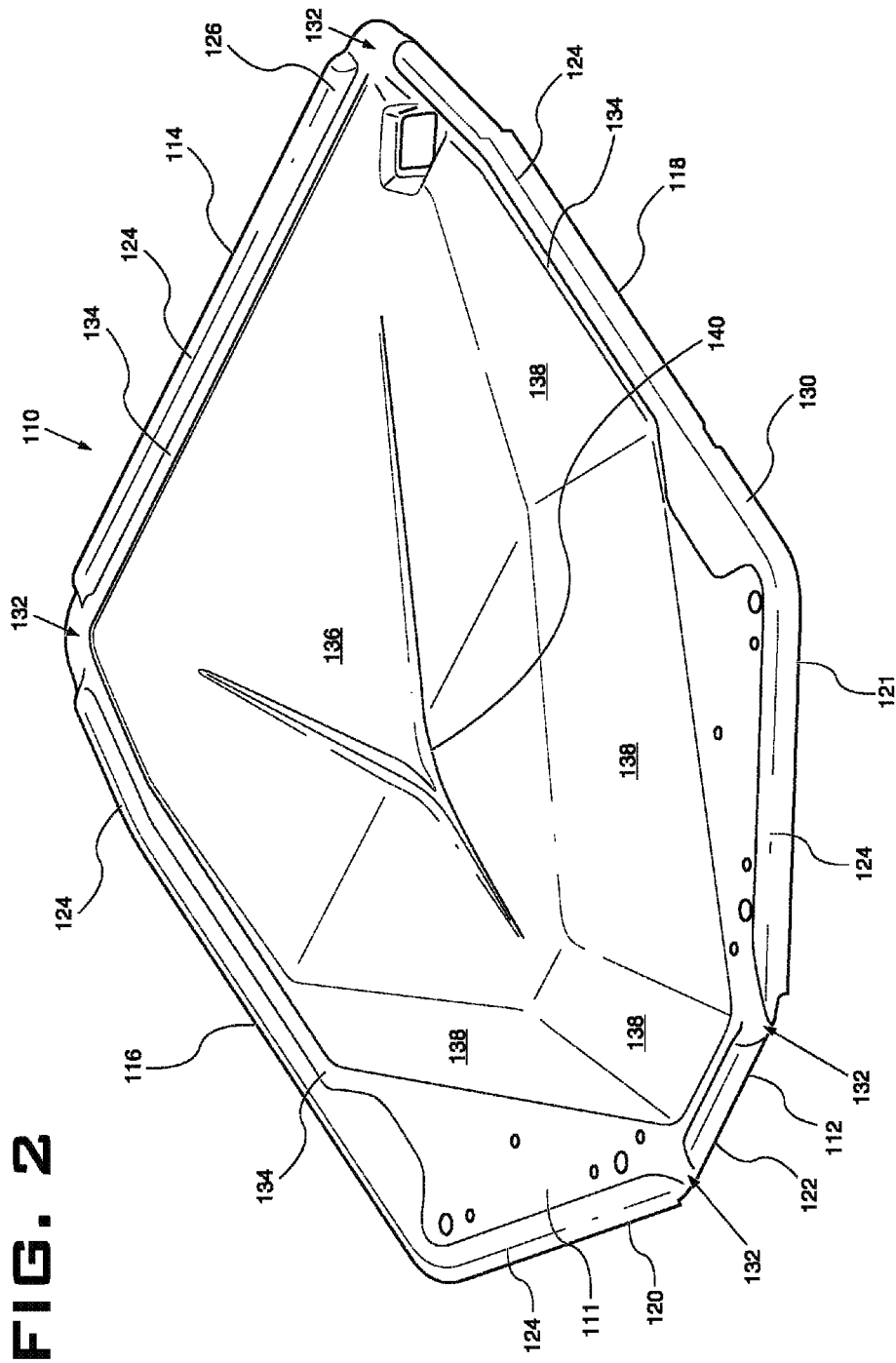
FIG. 2 is perspective view of a stamped roof panel according to the present disclosure including a protrusion around the periphery.
Figure 3:
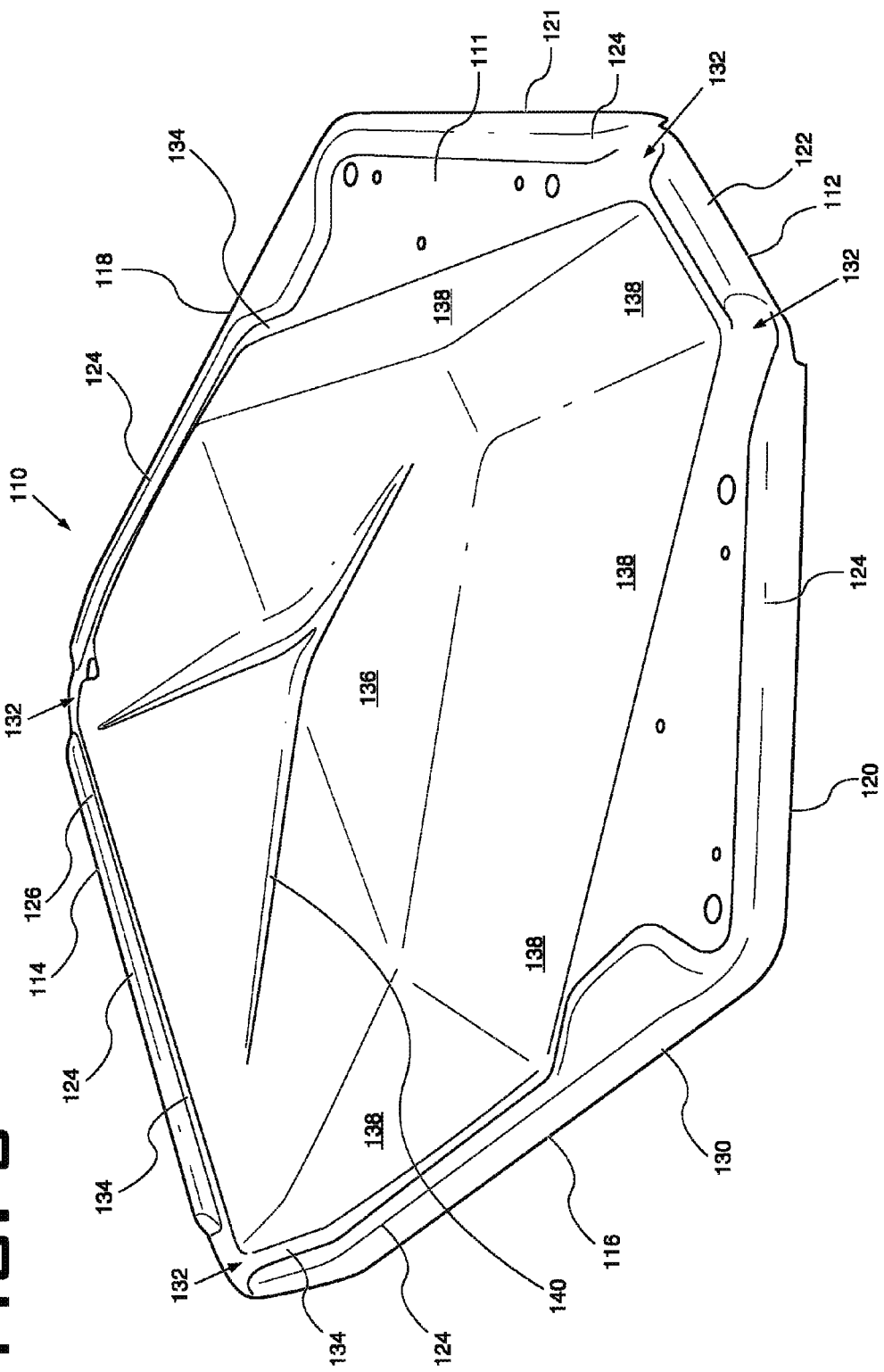
FIG. 3 is another perspective view of the stamped roof panel of FIG. 2.
Figure 4:
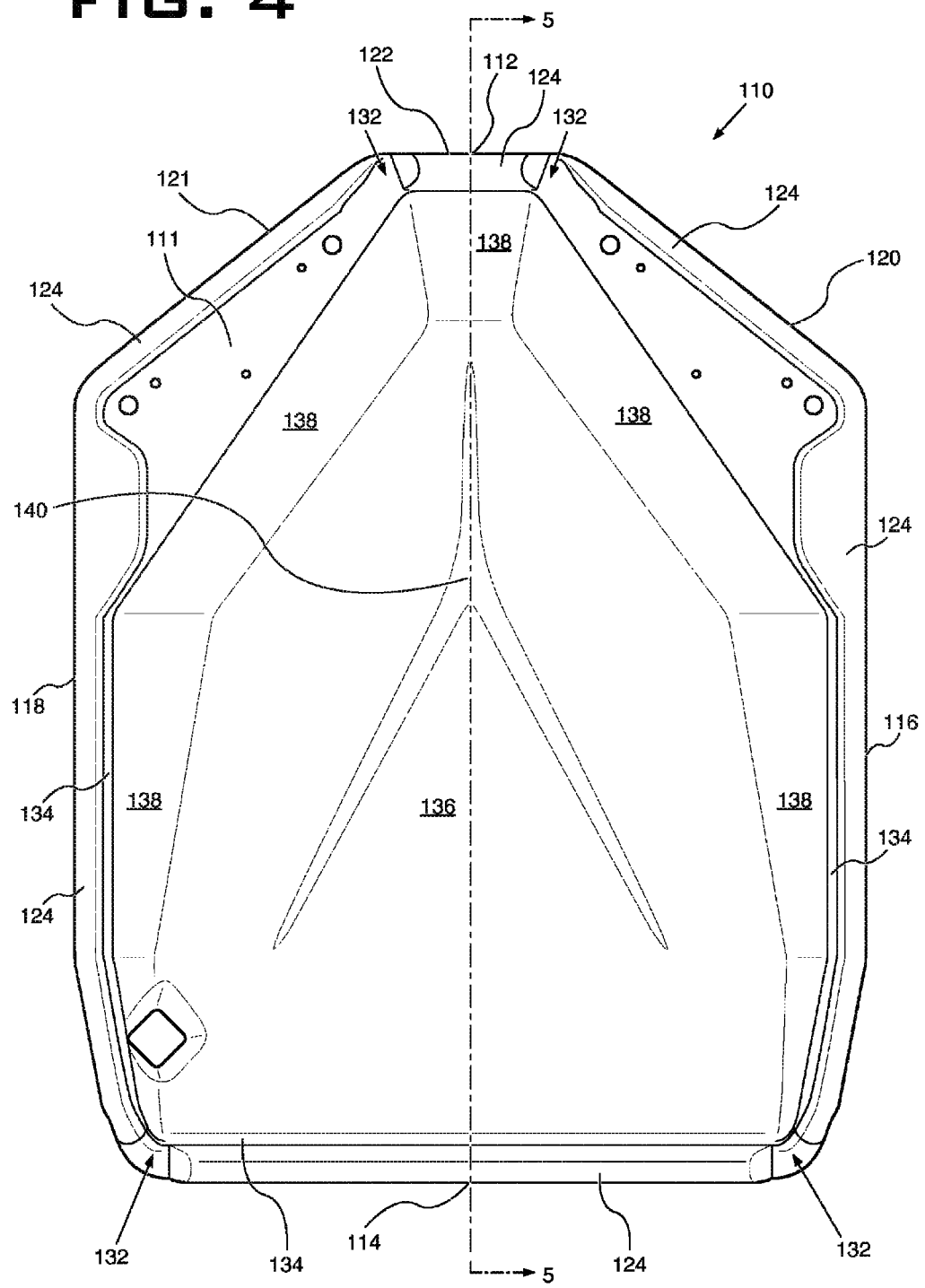
FIG. 4 is a top view of the stamped roof panel.
Figure 5:
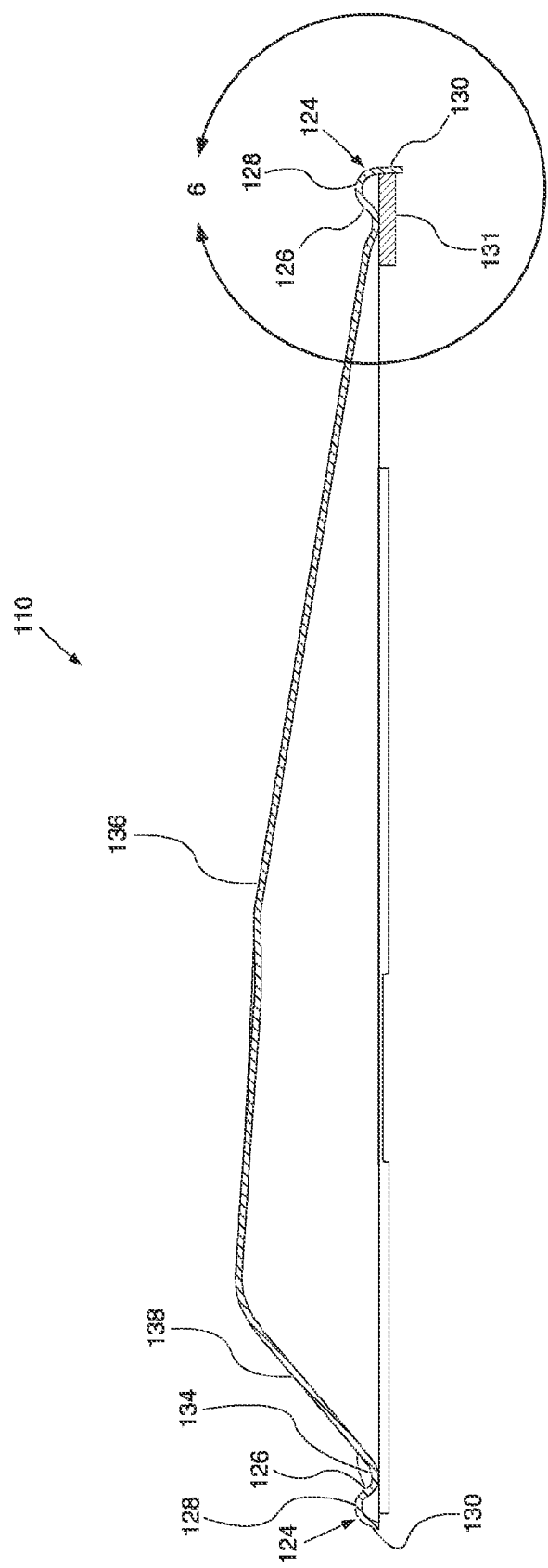
FIG. 5 is cross section view of the stamped roof panel taken generally along line 5-5 of FIG. 4.

As best shown in FIGS. 2-4, one or more drainage gaps 132 may be provided in the protrusion 124. In the embodiment depicted, first and second drainage gaps 132 may be provided at or proximate the intersection of the rear edge 114 and first and second side edges 116, 118. In addition, third and fourth drainage gaps 132 in the protrusion 124 may be provided proximate to where the angled side portions 120 and 121 meet the center portion 122 of the front edge 112. While a particular embodiment of the stamped metal roof panel 110 with four drainage gaps 132 is shown and described, it is contemplated that any number of drainage gaps 132 may be included at any desired locations.

The drainage gaps 132 may each be formed as an extension of the base portion 111 extending between adjacent portions of the protrusion 124. In other words, the drainage gaps 132 may each be formed by a break in the protrusion 124 where the base portion 111 extends to the outer periphery of the roof panel without interruption. These drainage gaps 132 may be strategically positioned above the upright support posts 108 of the cab 100, and their location may therefore vary depending upon the number and positioning of the upright support posts 108. Locating the drainage gaps 132 above upright support posts 108 may reduce the likelihood that draining water, or other fluids, will obscure an operators view through a window of the cab 100.

The stamped metal roof panel 110 may further include a raised panel 136 spaced upwardly from the base portion 111. The raised panel 136 may be supported by a plurality of side surfaces 138 extending upwardly from the base portion 111. In certain embodiments, the side surfaces 138 may be sloped relative to the base portion 111 so as to form sloped side surfaces 138 to facilitate the flow of water and snow downlwardly toward the base portion 111. In the embodiment shown, the raised panel 136 extends upwardly from the base portion 111 adjacent the rear edge 114 at an angle. The bottom edges of the side surfaces 138 may be spaced from the interior of the protrusion 124 to form a channel 134 that helps to direct water and snow to the drainage gaps 132. The channel 134 may also provide a conduit receiver to secure any wires or conduits being placed along the stamped metal roof panel 110. The protrusion 124 and the raised panel 136 provide support on both sides of the wire conduit to protect them from falling objects and to secure them in place.

The geometry of the raised panel 136 may also act to influence the natural frequency of the stamped metal roof panel 110. For instance, a stiffening groove 140 may optionally be provided in the raised panel 136 to strengthen the panel and to affect the natural frequency of the stamped metal roof panel 110. As will be appreciated by those skilled in the art, the stiffening groove 140 may be provided in any desired shape that is suited to provide strength at one or more positions on the raised panel 136. In the particular embodiment shown, the stiffening groove 140 is generally Y-shaped and is positioned substantially centered on the raised panel 136.

INDUSTRIAL APPLICABILITY

The stamped metal roof panel 110 of the present disclosure may be useful with any utility vehicle having a cab 100, including agricultural and construction vehicles or any other off-road vehicles. The stamped metal roof panel 110 includes less welds by virtue of the manufacturing process used to form the stamped panel as a single integral component, and therefore has less potential failure and water leakage points, improved aesthetics, a reduced number of components, and allows for improved efficiency in assembling of the cab 100 as compared to prior art cabs and roof panels. The stamped metal roof panel 110 may also eliminate many quality issues associated with assembled roof panels.

The protrusion 124, channel 134 and/or drainage gaps 132 around the periphery of the stamped metal roof panel 110 help to control water and snow shedding from the cab 100. The drainage gaps 132 may be strategically positioned over the upright support posts 108 so as to avoid water run-off directly over a window or door of the cab 100. This placement of the drainage gaps 132 also helps to avoid window streaking caused by water drainage over the windows. The raised panel 136 provides increased head room within the cab 100, and if angled as shown in the drawings, may further assist water and snow shedding. The raised panel 136 may directed water, snow or other precipitation outwardly toward the periphery of the stamped metal roof panel 110, and the protrusion 124 and channel 134 may direct that water, snow or other precipitation to strategically placed drainage gaps 132 where it drains from the stamped metal roof panel 110.

Additionally, the raised panel 136 may also create additional space for locating internal and external cab 100 components and integrated cab 100 storage areas. The stiffening groove 140 may help to strengthen the raised panel 136 and stamped metal roof panel 110 and to control the natural frequency of the component.

A protrusion 124 as described herein having a second leg 130 that extends below the base portion 111 to form an edge wrap may provide strength and safety benefits in addition to prevention of water infiltration. A stamped metal roof panel 110 with an edge wrap at the periphery may be welded to the wall panels 106, upright support posts 108 and/or the horizontal plate 131 at an interior surface of the second leg 130 of the protrusion 124. This placement of the weld results in tension forces acting on the weld when high impact forces act upon the roof panel (e.g. falling objects), rather than shear forces that might be generated when configured alternatively.

The stamped metal roof panel 110 of the present disclosure, and a cab 100 for a utility vehicle including the stamped roof panel, may provide falling-object and rolling-object protection equal to or better than prior art utility vehicle cab 100 assemblies. In certain embodiments, where required, the cab 100 of the present disclosure may meet falling-object protective structure (FOPS) thresholds according to the test methods and standards set forth in SAE J231 and ISO 3449. Similarly, where required, the cab 100 of the present disclosure may meet roll-over protective structure (ROPS) thresholds according to the test methods and standards set forth in SAE J231 and ISO 3449.

It will be apparent to those skilled in the art that various modifications and variations can be made to the stamped roof cab 100 of the present disclosure without departing from the scope of the disclosure. Other embodiments will be apparent to those skilled in the art from consideration of the specification and practice of the device disclosed herein. It is intended that the specification and examples be considered as exemplary only, with a true scope of the disclosure being indicated by the following claims and their equivalent.

What is claimed is:

1. A stamped metal roof panel adapted for use on a utility vehicle, the stamped roof panel comprising:
   a front edge, a rear edge, and first and second side edges spaced from one another and interconnecting the front and rear edges, the front, rear and side edges forming a periphery of the roof panel;
   a base portion;
   an outwardly projecting protrusion extending from the base portion around substantially all of the periphery of the roof panel;
   a first drainage gap formed as a first extension of the base portion in between adjacent portions of the protrusion proximate an intersection of the rear edge and the first side edge;
   a second drainage gap formed as a second extension of the base portion in between adjacent portions of the protrusion proximate an intersection of the rear edge and the second side edge; and
   a third drainage gap formed as a third extension of the base portion in between adjacent portions of the protrusion along the front edge.

2. The stamped roof panel of claim 1, wherein the protrusion further includes a fourth drainage gap formed as a fourth extension of the base portion in between adjacent portions of the protrusion along the front edge.

3. The stamped roof panel of claim 1, further comprising a raised panel that is spaced upwardly from the base portion and angled relative to the base portion.

4. The stamped roof panel of claim 3, wherein the raised panel extends upwardly at an angle relative to the base portion from proximate the rear edge.

5. The stamped roof panel of claim 3, wherein side surfaces extend downwardly from the raised panel to the base portion.

6. The stamped roof panel of claim 5, wherein a channel is formed between lower edges of the side surfaces and the protrusion.

7. The stamped roof panel of claim 3, wherein the raised panel includes a stiffening groove.

8. The stamped roof panel of claim 1, wherein the protrusion has an arcuate sectional profile with a first leg extending from the base portion, a bight portion, and a second leg extending from the bight portion opposite the first leg.

9. The stamped roof panel of claim 8, wherein the second leg of the protrusion extends beyond the base portion.

10. A cab for a utility vehicle comprising:
    a floor panel;
    a plurality of wall panels extending upwardly from the floor panel, each wall panel having a top edge; and
    a stamped metal roof panel including a base portion having a periphery; a protrusion extending outwardly around the periphery of the base portion, the protrusion having a first leg extending from the base portion, a bight portion extending from the first leg, and a second leg extending from the bight portion opposite the first leg, the second leg of the protrusion extending beyond the base portion and the top edge of the wall panels; and a plurality of drainage gaps in the protrusion.

11. The cab of claim 10, wherein the base portion includes a front edge, a rear edge, and first and second side edges spaced from one another and each extending between the front and rear edges, and wherein drainage gaps are provided adjacent to intersections of the rear edge and the first and second side edges.

12. The cab of claim 10, further comprising a plurality of upright support posts extending between the floor panel and the stamped roof panel, the drainage gaps in the protrusion of the stamped roof panel each being positioned adjacent to one of the upright support posts.

13. The cab of claim 10, further comprising a raised panel on the stamped roof panel, the raised panel extending upwardly from the base portion and angled relative to the base portion.

14. The cab of claim 13, wherein the raised panel extends upwardly at an angle relative to the base portion from proximate the rear edge.

15. The cab of claim 13, wherein the raised panel includes sloped side surfaces extending downwardly to the base portion.

16. The cab of claim 15, wherein a channel is formed between lower edges of the sloped side surfaces and the protrusion.

17. The cab of claim 13, wherein the raised panel includes a stiffening groove.

18. The cab of claim 12, wherein the stamped roof panel is secured to a horizontal plate supported at the top of the upright support posts by a weld between the second leg of the protrusion and the horizontal plate.

19. The cab of claim 10, wherein the floor panel and wall panels are each formed from a single stamped metal component.

20. A stamped metal roof panel adapted for use on a cab of a utility vehicle, the stamped metal roof panel comprising:

a base portion having a periphery;

a protrusion extending outwardly around the periphery of the base portion, the protrusion having an arcuate sectional profile with a first leg extending from the base portion, a bight portion, and a second leg extending from the bight portion opposite the first leg, the second leg of the protrusion extending beyond the base portion;

a plurality of drainage gaps in the protrusion, a raised panel on the stamped roof panel, the raised panel extending upwardly from the base portion and angled relative to the base portion;

a plurality of sloped side surfaces extending between the raised panel and the base portion;

a stiffening groove in the raised panel; and a channel formed between a lower edge of the sloped side surfaces and the protrusion.

\* \* \* \* \*